United States Patent
Takahashi

(10) Patent No.: US 7,468,653 B2
(45) Date of Patent: Dec. 23, 2008

(54) VEHICLE ALARM DEVICE, VEHICLE ALARMING METHOD, AND VEHICLE ALARM GENERATION PROGRAM

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 244 days.

(21) Appl. No.: 11/231,909

(22) Filed: Sep. 22, 2005

(65) Prior Publication Data

US 2006/0077050 A1    Apr. 13, 2006

(30) Foreign Application Priority Data

Sep. 28, 2004    (JP) .............................. 2004-281363

(51) Int. Cl.
*B60Q 1/00*    (2006.01)
(52) U.S. Cl. ...................... 340/435; 340/436; 340/438; 340/441
(58) Field of Classification Search ................. 340/433, 340/436, 438, 441, 435; 701/96; 362/487; 116/28 R
See application file for complete search history.

(56) References Cited

U.S. PATENT DOCUMENTS 6,091,323 A * 7/2000 Kawai ........................ 340/435

FOREIGN PATENT DOCUMENTS

| JP | H06-270715 A | 9/1994 |
| JP | H07-159525 A | 6/1995 |
| JP | H08-132931 A | 5/1996 |
| JP | H11-083501 A | 3/1999 |
| JP | P2001-052298 A | 2/2001 |
| JP | P2002-220035 A | 8/2002 |
| JP | 2003141697 A * | 5/2003 |
| JP | P2003-141697 A | 5/2003 |

OTHER PUBLICATIONS

"Development of Stereo Vision System for Automobile Environmental Perception" Keiji Hanawa and Yoshiyuki Sogawa, The Institute of Electronics, Information and Communication Engineers, Sep. 2001.
"Multi-feature Hierarchical Template Matching Using Distance Transforms" D.M. Gavrila, IEEE International Conference on Pattern Recognition, Brisbane Australia, 1998.
"Autonomous Driving approaches Downtown" U. Franke and D. Gavrila, IEEE Intelligent Systems, vol. 13, nr. 6, 1999.

* cited by examiner

*Primary Examiner*—George A Bugg
*Assistant Examiner*—Travis R Hunnings
(74) *Attorney, Agent, or Firm*—Sughrue Mion, PLLC

(57) ABSTRACT

To provide a vehicle alarm device, a vehicle alarming method and a vehicle alarm generation program, capable of describing driving characteristics of a driver in detail and generating an alarm at appropriate timing, without specifying a deceleration starting operation and the time when a driver is aware of the necessity of deceleration. An alarm determination unit refers to alarm speed data in an alarm speed database and obtains an alarm speed data value corresponding to the distance to an object recognized by an object recognition unit, and then compares the alarm speed data value with a current speed of the own vehicle outputted by a speed measurement unit. If the own vehicle speed exceeds the alarm speed data value, the alarm determination unit determines that it is an abnormal state where the driver is not aware of a "red light" or a "stop sign".

25 Claims, 12 Drawing Sheets

EXAMPLE OF ALARM SPEED DATA
CORRESPONDING TO 0~10km PER HOUR

EXAMPLE OF ALARM SPEED DATA
CORRESPONDING TO 11~20km PER HOUR

EXAMPLE OF ALARM SPEED DATA
CORRESPONDING TO 21~30km PER HOUR

ALARM SPEED DATA CORRESPONDING
TO 11~20km PER HOUR

[ROAD SURFACE : SNOWY
OBJECT : RED LIGHT]

ALARM SPEED DATA CORRESPONDING
TO 21~30km PER HOUR

[ROAD SURFACE : ASPHALT
OBJECT : STOP SIGN]

VEHICLE ALARM DEVICE, VEHICLE ALARMING METHOD, AND VEHICLE ALARM GENERATION PROGRAM

BACKGROUND OF THE INVENTION

1. Field of the Invention

The present invention relates to an alarm device for a vehicle, an alarming method for a vehicle, and an alarm generation program. In particular, the present invention relates to an alarm device for a vehicle, an alarming method for a vehicle, and an alarm generation program for a vehicle, for generating alarms relating to objects such as a "red light", a "stop sign" and a "pedestrian" existing ahead of the own vehicle at appropriate timings while learning driving characteristics of the driver.

2. Related Art

Inventions have been proposed to enable the timing of generating an alarm to be adjusted while considering driving characteristics of a driver, in an alarm device for a vehicle to alert the driver of the own vehicle that an object such as a "red light", a "stop sign" or a "pedestrian" urging a stop to the own vehicle exists.

Japanese Patent Application Laid-open No. 2002-220035 (paragraph [0020] and FIG. 1) (Patent Document 1) describes an alarm device for a vehicle, in which a driver sets a characteristic value relating to the driving characteristics of the driver with a dial, and the value is assigned to an equation which has been stored on the device so as to calculate an inter-vehicular distance for generating an alarm (hereinafter referred to as an inter-vehicular distance for an alarm), and when the distance from the own vehicle to the object becomes smaller than the inter-vehicular distance for an alarm, an alarm is generated. According to this invention, timing of an alarm is adjustable by setting a dial value freely.

Japanese Patent Application Laid-open No. 2003-141697 (paragraphs [0065] to [0069]) (Patent Document 2) describes an alarm device for a vehicle in which an inter-vehicular distance for an alarm is calculated from a free running time computed from the current point to a point before a predetermined time (a time period from a point where a driver feels braking is required to a point he/she actually presses the brake pedal) and the own vehicle average deceleration speed, and when the distance from the own vehicle to the object becomes smaller than the inter-vehicular distance for an alarm, an alarm is generated. According to this invention, two parameters, that is, (1) free running time and (2) own vehicle average deceleration speed, are set while considering the driving record up to the point before the predetermined time and the secondary statistic, so it is possible to set alarm timing for each driver while reflecting the driving characteristics of the driver.

Further, as an alarming technique for only a case of approaching a precedent vehicle, there is known a device which alerts a driver to an approach to a precedent vehicle during traveling at an appropriate timing. Japanese Patent Application Laid-open No. 8-132931 (pp. 3-4, paragraph [0045] and FIG. 4) (Patent Document 3) describes a travel control device for a vehicle in which based on an inter-vehicular distance, the own vehicle speed and a relative speed with the precedent vehicle during traveling while following the precedent vehicle, an inter-vehicular distance for starting deceleration is calculated from a predetermined driver model so as to follow the precedent vehicle under conditions of constant deceleration speed or deceleration time, and based on the inter-vehicular distance for starting deceleration, travel of the own vehicle is controlled and an alarm is generated.

Japanese Patent Application Laid-open No. 7-159525 (paragraph [0013] and FIG. 6) (Patent Document 4) describes a precedent vehicle approaching alarm device in which a value of (inter-vehicle distance/relative speed) of a deceleration starting time is learned, and based on the value, a timing of generating an alarm to alert each driver to an approach of the precedent vehicle is controlled.

However, there was a problem that the accuracy of timing to be calculated had a limitation in the conventional art since the deceleration speed of the own vehicle was assumed to be constant, which was common in the conventional art. Since the deceleration speed is not constant in an actual deceleration operation, there is required a system capable of describing the driving characteristics of a driver in detail.

Further, relating to the invention of Patent Documents 2 to 4, there is a problem when extracting values of average deceleration rate, free running time, and (inter-vehicular distance/relative speed) at the time of starting deceleration from the actual travel history of a driver. In order to extract the average deceleration rate and (inter-vehicle distance/relative speed) at the time of starting deceleration, it is required to further specify a deceleration starting operation accurately. However, since the decelerating operation is performed in various events, it is not easy to specify an intended decelerating manipulation among many decelerating operations. Similarly, as for a free running time, it is required to specify the time when a driver is aware of a necessity of deceleration. However, it is very difficult to specify such a time. Further, until drive history data of a certain number of times or hours is obtained in order to calculate a primary or secondary static of moving characteristics from the past drive history, it must depend on an initial value or the like.

SUMMARY OF THE INVENTION

It is therefore an object of the present invention to provide an alarm device for a vehicle, an alarming method for a vehicle, and an alarm generating program, capable of describing driving characteristics of a driver in detail and generating an alarm at appropriate timing, without a need of specifying a deceleration starting operation and the time when a driver is aware of a necessity of deceleration. Further, it is an object of the present invention to provide an alarm device for a vehicle and an alarming method for a vehicle capable of realizing alarm timing reflecting the orientation of a driver even in a case where the past driving history data is not obtained sufficiently.

An alarm device for a vehicle according to the present invention comprises: an object recognition unit for recognizing an object existing ahead of an own vehicle, and measuring a distance to the object; a speed measurement unit for measuring the speed of the own vehicle; an alarm speed database including alarm speed data expressing a deceleration operation which a driver of the own vehicle likes with a distance from the own vehicle to the object and the speed of the own vehicle; an alarm determination unit for extracting a speed corresponding to the distance to the object by referring to the alarm speed data and set it as an alarm speed value at the current time, and when the speed of the own vehicle at the current time exceeds the alarm speed value, determining as abnormal; and an alarm output unit for outputting an alarm when the alarm determination unit determined as abnormal. According to such a configuration, there is no need to specify an deceleration starting operation and the time when a driver is aware of the necessity of deceleration, and further, the relationship between the distance to the object and the own vehicle speed that the driver likes can be described in detail, so it is possible to calculate timing of an alarm matching the taste of the driver more than conventional technique.

The alarm device for the vehicle may further include an alarm speed database learning unit for correcting a value of the alarm speed data so as to be close to the relationship between the distance to the object recognized by the object recognition unit and the own vehicle speed. With such a configuration, it is possible to provide an alarm device for a vehicle, an alarming method for a vehicle and an alarm generation program for a vehicle, capable of acquiring alarm timing reflecting the orientation of the driver even in a case where the past driving history data is not obtained sufficiently. Further, at this time, it is possible to perform leaning without specifying a deceleration starting operation and the time when the driver is aware of the necessity of deceleration.

Further, in the alarm device for the vehicle, the alarm speed database may include plural pieces of alarm speed data, and the alarm determination unit may determine alarm speed data used for an alarm determination based on the own vehicle speed at a point where the distance from the object recognized by the object recognition unit and the own vehicle speed satisfy predetermined conditions for the first time and on the attribute of the object. With such a configuration, it is possible to generate an alarm at timing matching the taste of the driver more precisely.

Further, in the alarm device for the vehicle, the alarm speed database learning unit may determine alarm speed data to be corrected, based on the own vehicle speed at the point where the distance from the object recognized by the object recognition unit and the own vehicle speed satisfy predetermined conditions for the first time, and on the attribute of the object. With such a configuration, alarm speed data can be managed for an own vehicle speed and each attribute of the object. Therefore, it is possible to generate an alarm at timing matching the taste of the driver more precisely.

Further, the alarm device for the vehicle further includes a road condition recognition unit for recognizing the road condition of a road where the own vehicle travels, and the alarm speed database learning unit and the alarm determination unit may determine alarm speed data to be used while taking the road condition into consideration. With such a configuration, alarm speed data corresponding to the road condition can be referred to, so it is possible to judge alarm timing more precisely.

Further, the alarm device for the vehicle further includes a sight line detection unit for detecting a sight line direction of a driver of the own vehicle, and an object awareness state judgment unit for determining whether the driver is aware of an existence of the object from information of a direction of the object recognized by the object recognition unit and a sight line direction detected by the sight line detection unit. Even in a case where the speed of the own vehicle exceeds the alarm speed value, the alarm determination unit may retain a judgment of abnormality for a predetermined period when the object awareness state judgment unit determines that the driver has been aware of the object. With such a configuration, it is possible to generate an alarm only when it is assumed that the driver is not aware of the object.

Further, in an alarming method for a vehicle according to the present invention, the object recognition unit recognizes an object existing ahead of the own vehicle, and measures a distance to the object; the speed measurement unit measures the speed of the own vehicle; and the alarm determination unit extracts a speed corresponding to the distance to the object by referring to the alarm speed database including alarm speed data expressing a deceleration operation that the driver of the own vehicle likes with the distance to the object and the speed, and setting it as an alarm speed value at a current time, and if the speed of the own vehicle at the current time exceeds the alarm speed value, determining as abnormal, and the alarm output unit outputs an alarm when the alarm determination unit determines as abnormal.

Further, in the alarming method for the vehicle, the alarm speed database learning unit may correct a value of the alarm speed data so as to be close to the relationship between the distance to the object recorded by the object recognition unit and the own vehicle speed.

(Effects of the Invention)

According to the present invention, a deceleration starting operation and the time when a driver is aware of the necessity of deceleration are not required to be specified, and further, the relationship between the distance to an object and a speed that the driver likes can be described in detail. Therefore, it is possible to generate an alarm at timing matching the taste of the driver more than conventional art. Further, alarm timing reflecting the orientation of the driver is acquired not by obtaining the primary or secondary static from the past drive history data, but by correcting the current alarm speed data so as to be close to the vehicle speed actually measured. Therefore, it is possible to learn in a state where drive history data is not obtained sufficiently.

Further, plural pieces of alarm speed data can be held for the respective attributes of object, road conditions and vehicle speeds, so alarm speed data suitable for a current state can be used for alarm determination or learning. Therefore, it is possible to cope with a case where the driving characteristics of the driver differ depending on the conditions such as attributes of the object, road conditions and vehicle speeds. Further, since there is a system of delaying alarm timing for a certain period of time when it is assumed that the driver is aware of the object, there is an effect that the driver is not required to listen to unnecessary alarm even when deceleration is somewhat delayed than usual.

PREFERRED EMBODIMENTS OF THE INVENTION

Hereinafter, embodiments of the present invention will be explained in detail based on the drawings.

Embodiment 1

Figure 1:
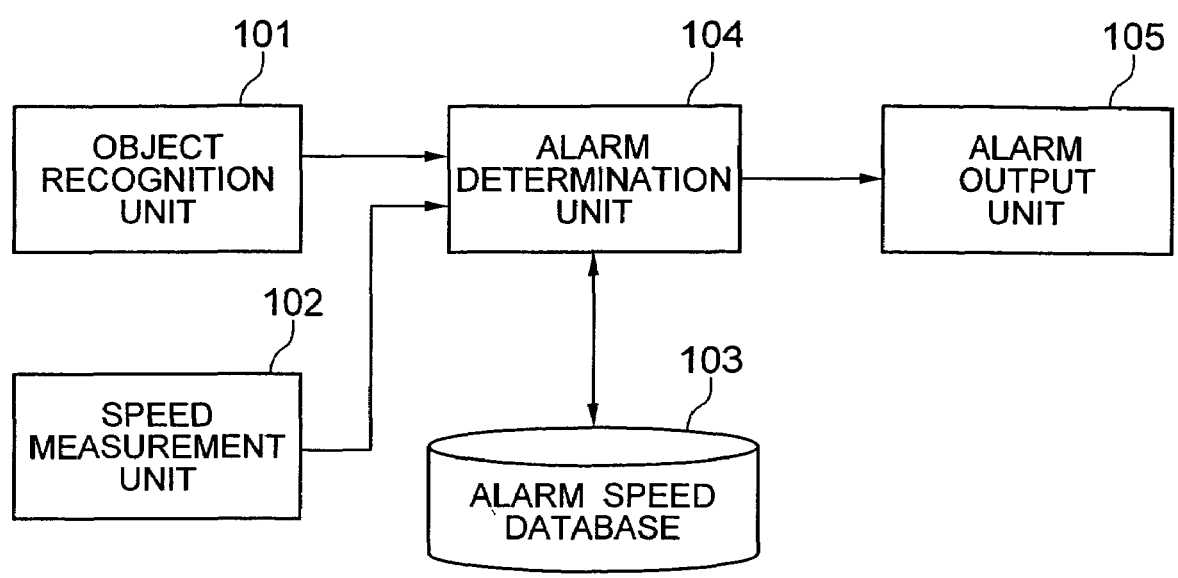
FIG. 1 is a block diagram showing the configuration of an alarm device for a vehicle according to an embodiment 1 of the present invention.

An alarm device for a vehicle according to an embodiment 1 of the present invention shown in FIG. 1 includes an object recognition unit 101, a speed measurement unit 102, an alarm speed database 103, an alarm determination unit 104 and an alarm output unit 105.

The object recognition unit 101 is composed of an on-vehicle stereo camera, an image processing board and the like. The object recognition unit 101 detects, from an image photographed in front of the own vehicle, objects such as matters like a "signal (red light)" and a "stop sign", and a "stop line" and a "stopped vehicle" existing in front of them which have been set beforehand, measures distances from the own vehicle to the objects, identifies objects constituting a set based on their positioning relationships, and outputs information about the attributes and the positions of the objects detected and information about the objects constituting a set to the alarm determination unit 104. The objects constituting a set mean a "signal (red light)" and a "stop line" corresponding thereto at an intersection, for example. When an object recognized is a "pedestrian", a "vehicle stopped for conjunction" or the like, such information may not be included in the information of the objects constituting the set.

Recognition of road signs, road markings, vehicles and the like by the object recognition unit 101 is realized by using a well-known image recognition technique disclosed in "Development of Stereo Image Recognition Device for Monitoring in front of Automobile", by Hanawa et al., the Institute of Electronics, Information and Communication Engineers, Technical Report of IEICE, PRMU2001-90, pp 37-42, "Multi-feature Hierarchical Template Matching Using Distance Transforms" by Gavrila et al., International Conference on Pattern Recognition (ICPR) 1998, Proceedings, "Autonomous Driving Approaches Downtown" by Franke et al., IEEE Intelligent Systems, Vol. 13, No. 6, 1999, and the like, and an obstacle sensing device using a laser radar or a millimeter radar currently installed optionally in a new domestic car as a safety function for a family car.

The speed measurement unit 102 consists of a vehicle speed pulse sensor, and monitors the speed of the own vehicle and outputs it to the alarm determination unit 104.

The alarm speed database 103 is a group of pieces of alarm speed data indicating driving characteristics of a driver of the own vehicle. The alarm speed data indicates speed data that the driver likes with respect to a distance to a position where the own vehicle must stop. The alarm speed data serves as the criteria for judging whether to generate an alarm to the driver. In the case of a "red light" or a "stop sign" for example, the alarm speed data is speed data that the driver likes with respect to a distance to a "stop line" making a set therewith. Further, in the case of a "pedestrian" or a "vehicle stopped for traffic congestion", the alarm speed data is speed data that the driver likes with respect to a distance thereto. However, if the vehicle has already stopped before the "stop line" of the intersection where the "red light" is lighted, distance data to the "stopped vehicle" prevails over the speed data that the driver likes.

Figure 2:
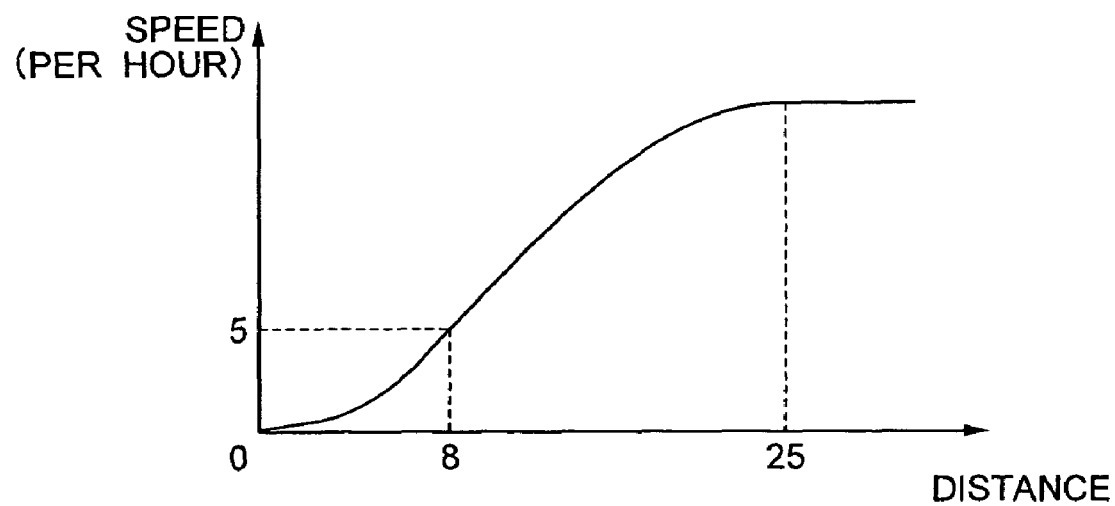
FIG. 2 shows an example of alarm speed data of a driver A.
Figure 3:
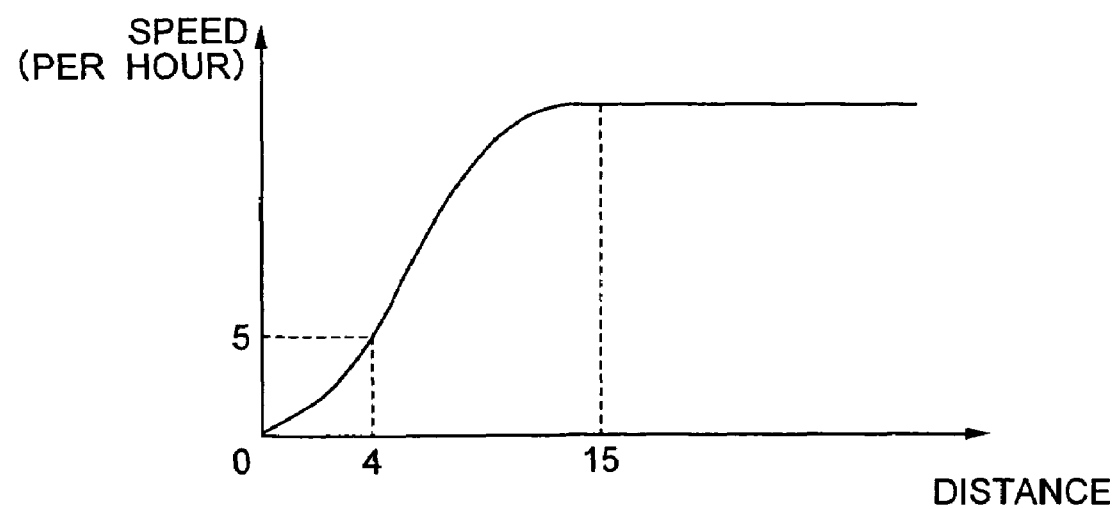
FIG. 3 shows an example of alarm speed data of a driver B.

FIGS. 2 and 3 show examples of alarm speed data in the present embodiment. In each Fig., the horizontal axis shows a distance from the own vehicle to a "stop line", and the vertical axis shows the speed of the own vehicle. As obvious from these Figs., the alarm speed data may have nonlinearity in the present embodiment. FIG. 2 shows the driving characteristics (characteristics in braking operation) of a driver A. This Fig. shows that the driver A likes such driving that he/she starts deceleration at a point of 25 m before the stop line, and decelerates to about 5 km per hour by a point of 8 m before, then drives slowly and stops at the stop line. On the other hand, FIG. 3 shows driving characteristics of another driver B, indicating that the driver likes such driving that he/she abruptly decelerates the vehicle speed which is about 30 km per hour at a point of 15 m before the stop line to about 5 km per hour by the point of 4 m before, and then stops gradually.

In this way, the alarm speed data shows such driving characteristics of each driver that when he/she finds a "red light", a "stop sign" or the like, how he/she likes to decelerate, with what speed changes, to the corresponding "stop line". Comparing the driver A with the driver B based on FIGS. 2 and 3, it is found that the driver A likes to start braking earlier so as to decelerate gradually than the driving of the driver B. Therefore, it is possible to match alarm timing of the alarm device for the vehicle to the taste of each driver, by installing alarm speed data indicating driving characteristics that the driver of the vehicle likes as the alarm speed database 103, for each vehicle.

Further, as obvious from the examples of FIGS. 2 and 3, the alarm speed data is capable of expressing driving characteristics in a case where the deceleration rate of the speed is not constant. As specific methods of expression, speed values corresponding to distance values may be expressed in a lookup table format, or the range of distance may be divided in several sections and the relationship between the distance and speed may be expressed in equations. By dividing a section into small pieces, the accuracy of the deceleration rate is improved. Thereby, it is possible to perform a deceleration control matching the driving characteristics of the driver which is more precise than conventional examples in which a constant deceleration is assumed, and to optimize alarm timing.

The alarm determination unit 104 is composed of a CPU, a comparator and the like not shown, and determines momentarily whether to generate an alarm at the current time by using output values of the object recognition unit 101 and the speed measurement unit 102 and the contents of the alarm speed database 103.

Specifically, assuming that information of a "red light" and a "stop line" constituting a set is inputted from the object recognition unit 101, the alarm determination unit 104 refers to the alarm speed data in the alarm speed database 103, and obtains an alarm speed data value corresponding to the distance to the "stop line" measured. Then, the alarm determination unit 104 compares the alarm speed data value with the current speed of the own vehicle outputted from the speed measurement unit 102, and if the speed of the own vehicle exceeds the alarm speed data value, it determines the state as abnormal that the driver is not aware of the existence of the "red light" and the "stop sign".

Figure 6:
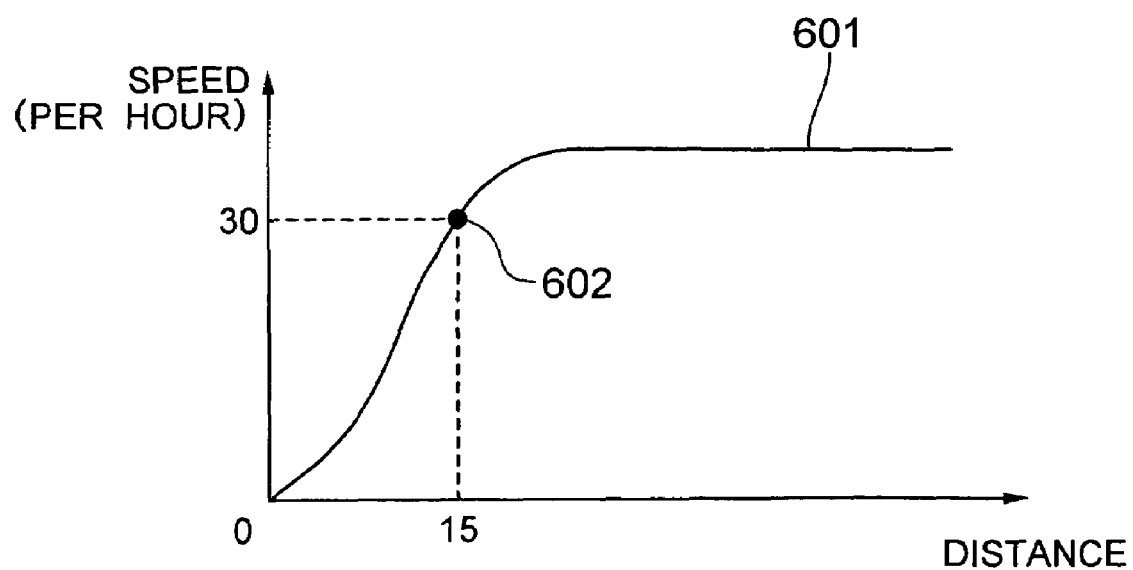
FIG. 6 shows an example of alarm speed data.

A specific example of operation determined as abnormal will be explained with reference to FIG. 6. First, when the object recognition unit 101 extracts information about a "red light" and a "stop line", the alarm determination unit 104 refers to alarm speed data 601. Assuming a fact that a distance to the "stop line" is 15 m is inputted simultaneously from the object recognition unit 101, the alarm determination unit 104 reads alarm speed data value 602 corresponding to the distance of 15 m, and sets the alarm speed data value 602 at the current time as 30 km per hour. At this time, if it is inputted that the speed of the own vehicle is 27 km per hour from the speed measurement unit 102, the speed of the own vehicle (27 km per hour) does not exceed the alarm speed data value (30 km per hour), so it is determined that the driver is aware of the "red light" at the current point. In contrast, if the speed of the own vehicle is 35 km per hour, exceeding the alarm speed data value, it is determined as abnormal.

If the object recognition unit 101 did not extract information about a "red light", a "stop sign" or the like at all, it is always determined as a normal state. If an object found at a time is not recognized by the object recognition unit at the next time since the object gets out of the imaging range, the object may not be treated as a determination object from the next time.

The alarm output unit 105 is composed of a speaker and a display. When the alarm determination unit 104 determines as abnormal, the alarm output unit 105 notifies it to the driver by means of a voice or an image.

Figure 4:
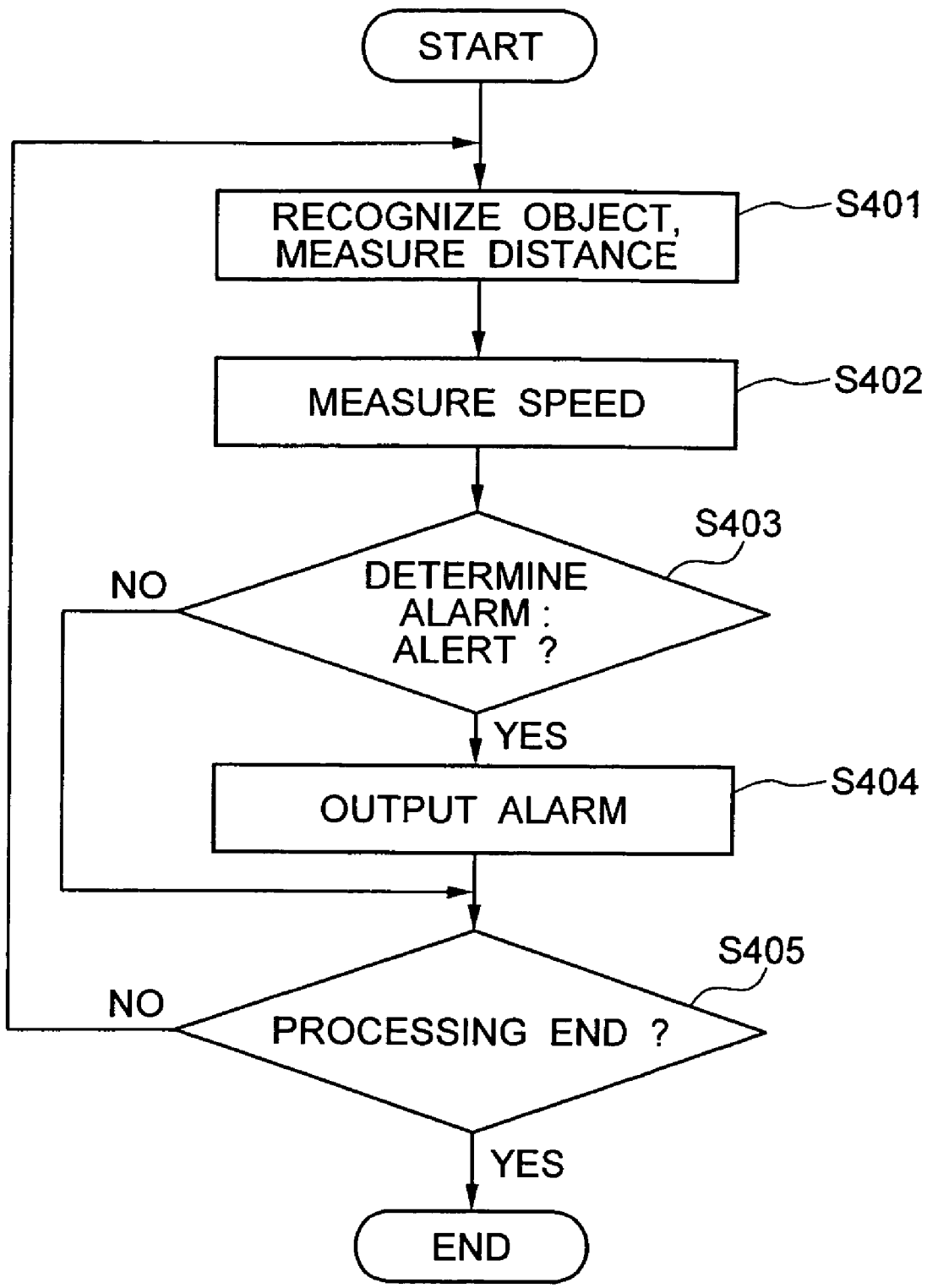
FIG. 4 is a flowchart showing an exemplary process of alarm processing performed by the alarm device for a vehicle.

Next, the operation of the alarm device for a vehicle according to the embodiment of the present invention shown in FIG. 1 will be explained in detail with reference to the drawings. FIG. 4 is a flowchart showing an exemplary process performed by the alarm device for a vehicle according to the embodiment of the present invention. Hereinafter, the operation of the flowchart used in the explanation of the embodiment of the present invention may be written by a program.

First, the object recognition unit 101 recognizes objects, such as those instructing to stop a vehicle like a "red light" and a "stop sign", and a "stop line" accompanying thereto, which have been set beforehand, from an on-vehicle camera image at a certain time, and measures distances to them, and grouping pieces of information of the objects forming a group, to thereby output information about attributes and distances of the objects to the alarm determination unit 104 (step S401).

Next, the current speed of the own vehicle is measured (step S402). Since this step is a process independent of step S401, step S402 may be performed prior to step S401, or they may be performed in parallel.

Next, for each object extracted in step S401, an alarm speed data value corresponding to a distance to the object by referring to the alarm speed database 103 is obtained, and the value is compared with the own vehicle speed measured in step S402 (step S403). If the own vehicle speed exceeds the alarm speed data value, it is determined as abnormal and an alarm is generated (step S404). If the own vehicle speed is below the alarm speed or no "stop sign" or "red light" is detected in the object recognition unit 101, an alarm is not generated and the processing is repeated from step S401. Repetitions of the processing from S401 to S404 are performed momentarily, not only the case that the driver pressing the brake pedal.

Figure 5:
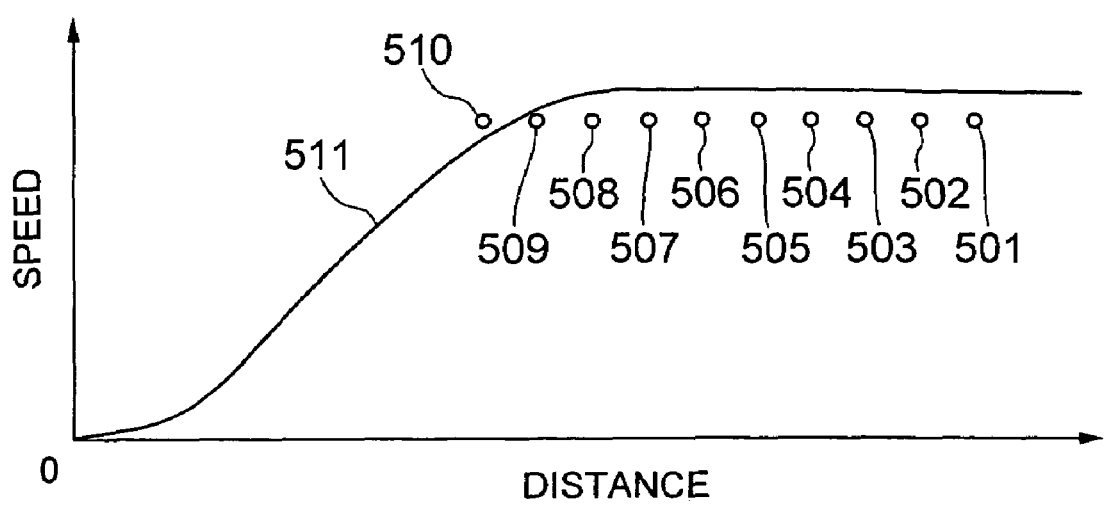
FIG. 5 is an illustration showing an example of alarm speed data and travel data of a vehicle.

With referring to FIG. 5, explanation will be given for a state where processing is performed momentarily. In FIG. 5, the horizontal axis shows the distance to the "stop line" currently found, and the vertical axis shows the speed of the own vehicle. Points 501 to 510 are those plotted changes in values of the distances to the "stop line" outputted from the object recognition unit 101 and of the own vehicle speeds outputted from the speed measurement unit 102, when the time has passed from t0 to t10, in which a state where the distance to the stop line becomes near as the time passes is shown. Between the time t0 and t9, the value of the own vehicle speed is smaller than the alarm speed data 511, so an alarm is not generated. At the point of the time t10, the own vehicle speed shown by the point 510 exceeds the alarm speed, so an alarm is outputted.

Figure 10A:
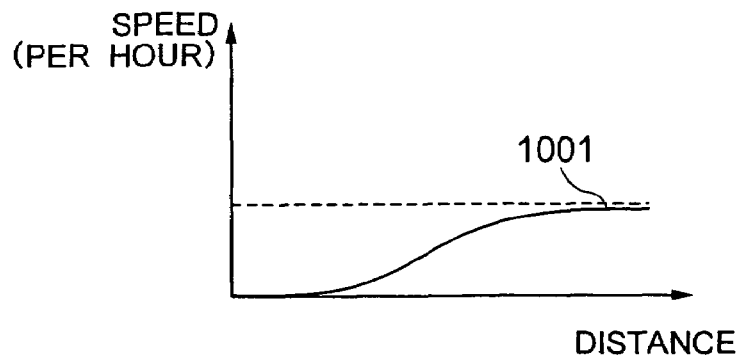
FIG. 10 shows examples of plural pieces of alarm speed data included in an alarm speed database.
Figure 10B:
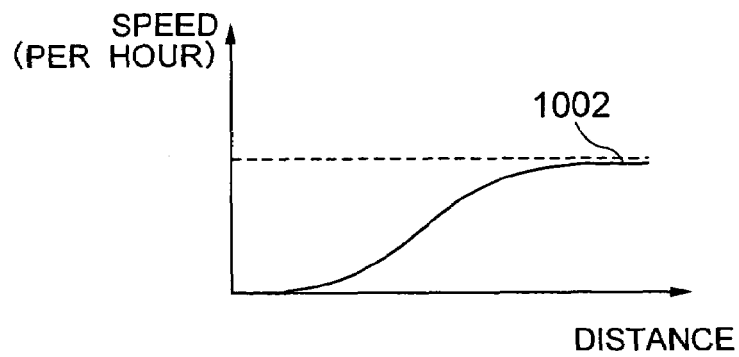
Figure 10C:
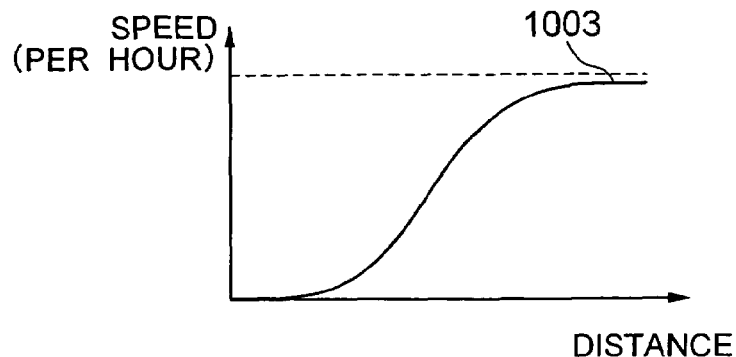

Although the embodiment described above shows a case where a set of alarm speed data shown in FIG. 2 is stored in the alarm speed database 103, alarm speed data may be plural as shown in FIG. 10. In this example, plural pieces of alarm speed data are prepared corresponding to the own vehicle speeds. For example, based on the distance to the object and the own vehicle speed at the point where the own vehicle speed comes to the condition defined beforehand, alarm speed data 1001 corresponding to 0 to 10 km per hour, alarm speed data 1002 corresponding to 11 km to 20 km per hour, and alarm speed data 1003 corresponding to 21 km to 30 km per hour may be held.

Figure 11A:
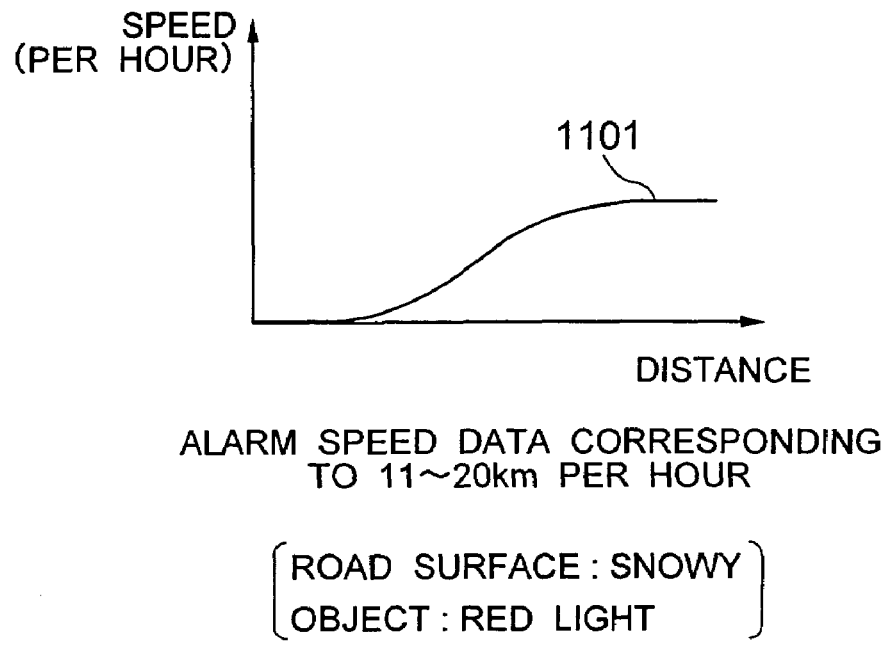
FIG. 11 shows examples of plural pieces of alarm speed data included in the alarm speed database.
Figure 11B:
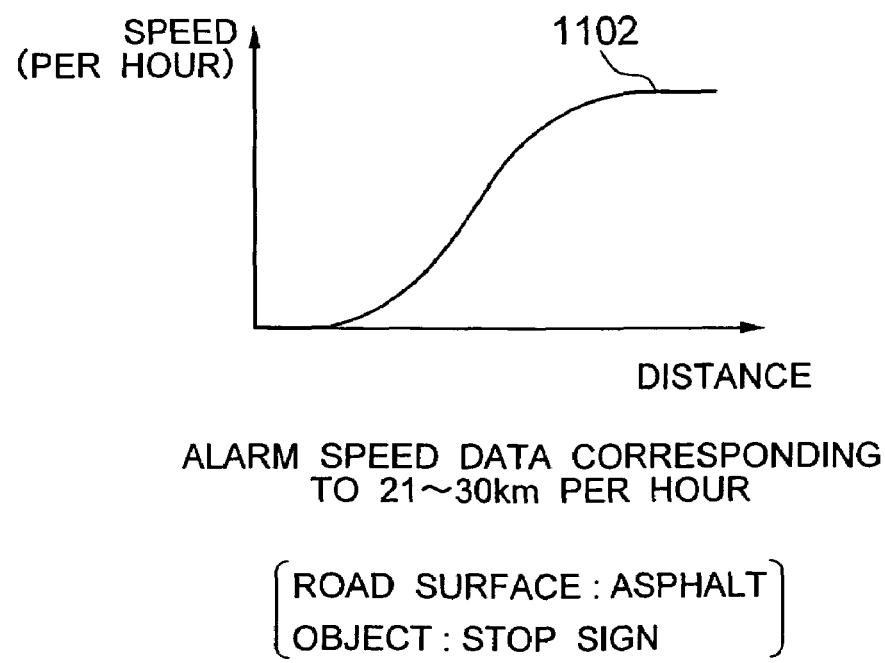

Further, as shown in FIG. 11, alarm speed data may be held for each combination of conditions such as road state conditions (road width 2 m-3 m, 3 m-4 m, etc.), road surface conditions (dried asphalt, wet asphalt, gravel road, snowy road, etc.), and attributes of the object ("red light", "stop sign", etc.).

If plural pieces of alarm speed data are held, the alarm judgment unit 104 is required to determine which alarm speed data is referred to when performing an alarm judgment. However, the alarm judgment unit 104 may select alarm speed data in which conditions for the road surface condition and the attributes of the object are satisfied, and relating to the own vehicle speed, may refer to alarm speed data corresponding to a speed of one rank faster (a little faster speed) than the own vehicle speed at the point where the distance to the object and the own vehicle speed satisfy the conditions set beforehand. Then, until the object is not recognized, the alarm speed data is referred to relating to the object. The reason for selecting the alarm speed data of one rank faster is not to generate an alarm even in a case of driving a little faster than usual, by giving a margin to the alarm speed data.

Further, conditions set beforehand include (1) a point where the distance to an object becomes 50 m or less for the first time, regardless of the own vehicle speed, and (2) a point where the distance to the object becomes smaller than "own vehicle speed*$\alpha$" ($\alpha$ is a constant). $\alpha$ is a constant determined by considering braking performance of the vehicle, a distance from the braking operation to the point where the vehicle stops, and the like. The "own vehicle speed*$\alpha$" is a value corresponding to the distance from the braking operation to the point where the own vehicle stops. Note that plural pieces of alarm speed data corresponding to the same conditions must not exist.

In the case where plural "red lights" or "stop signs" are recognized in the object recognition unit 101, alarm speed data is set for each of them.

Further, in the embodiment described above, although the explanation is limited to the case where an object recognized by the object recognition unit 101 is static or moves at a sufficiently low speed with respect to the own vehicle speed. However, a recognition object may be a precedent traveling vehicle. In such a case, the object recognition unit 101 further measures the speed of the precedent vehicle, and outputs the information to the alarm determination unit 104. Since the driving characteristics of the driver of the precedent vehicle is unknown to the alarm device of the own vehicle, the alarm determination unit 104 of the own vehicle may assume a position where the own vehicle can stop if the precedent vehicle brakes suddenly at the current time based on the maximum deceleration speed value set beforehand (assumption of the minimum travel distance until the precedent vehicle stops), and obtain an alarm speed data value corresponding to the distance to this position, and perform alarm determination.

Embodiment 2

Figure 7:
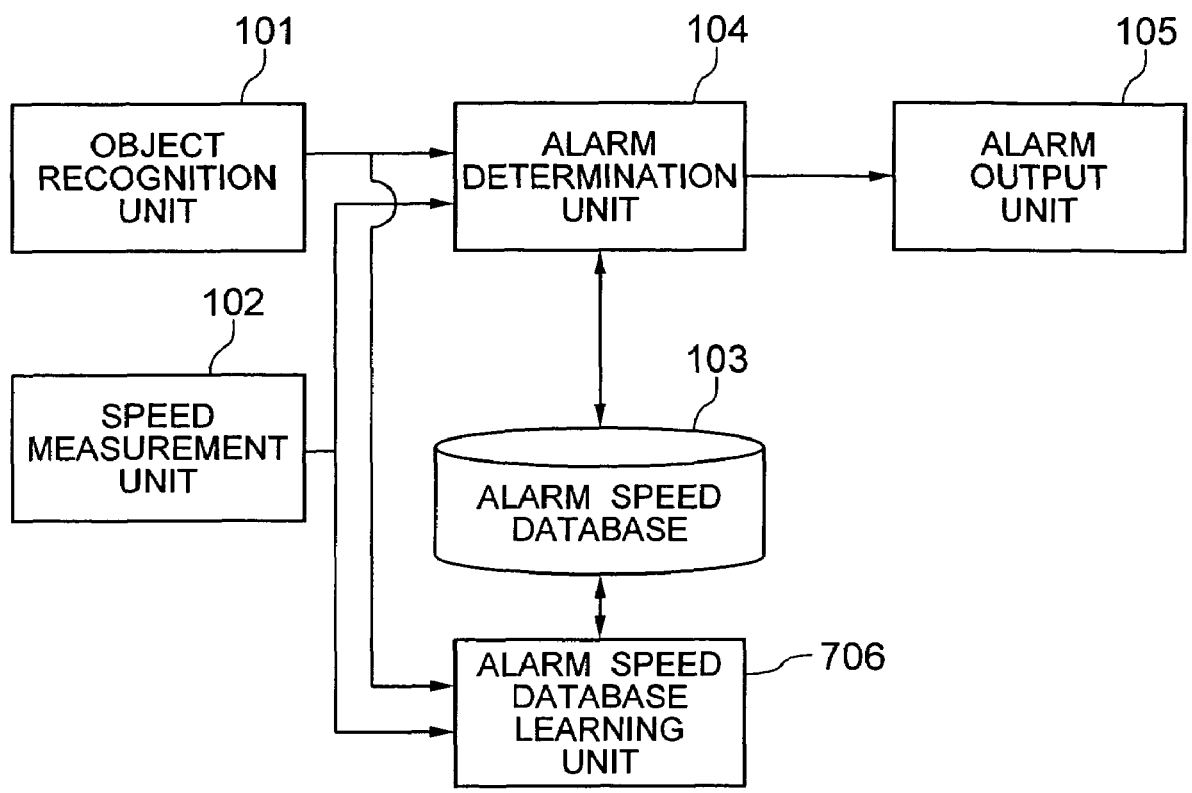
FIG. 7 is a block diagram showing an exemplary configuration of an alarm device for a vehicle according to an embodiment 2 of the present invention.

Hereinafter, an embodiment 2 of the present invention will be explained with reference to the drawings. FIG. 7 is a block diagram showing the configuration of an alarm device for a vehicle according to the embodiment 2 of the present invention. As shown in FIG. 7, the alarm device for a vehicle includes the object recognition unit 101, the speed measurement unit 102, the alarm speed database 103, the alarm determination unit 104, the alarm output unit 105, and the alarm speed database learning unit 706.

The functions of the object recognition unit 101 through the alarm output unit 105 are the same as those in the embodiment 1. However, in the present embodiment, the alarm speed database 103 includes plural pieces of alarm speed data corresponding to the own vehicle speed at the point where "distance to object<own vehicle speed*α" is satisfied. Further, in the alarm speed database 103, alarm speed data which an average driver likes is set as an initial value.

The alarm speed database learning unit 706 corrects the alarm speed data currently held so as to further match the driving characteristics of the driver of the own vehicle. Based on the own vehicle speed at the point where "(distance to the object recognized by the object recognition unit 101)<(own vehicle speed*α)", a piece of alarm speed data that the conditions are satisfied is selected from the alarm speed database 103. After that, the alarm speed database learning unit 706 refers to this alarm speed data with respect to this object until the object is not recognized. The selected alarm speed data is corrected so as to be close to the data outputted from the object recognition unit 101 and the speed measurement unit 102.

Figure 14:
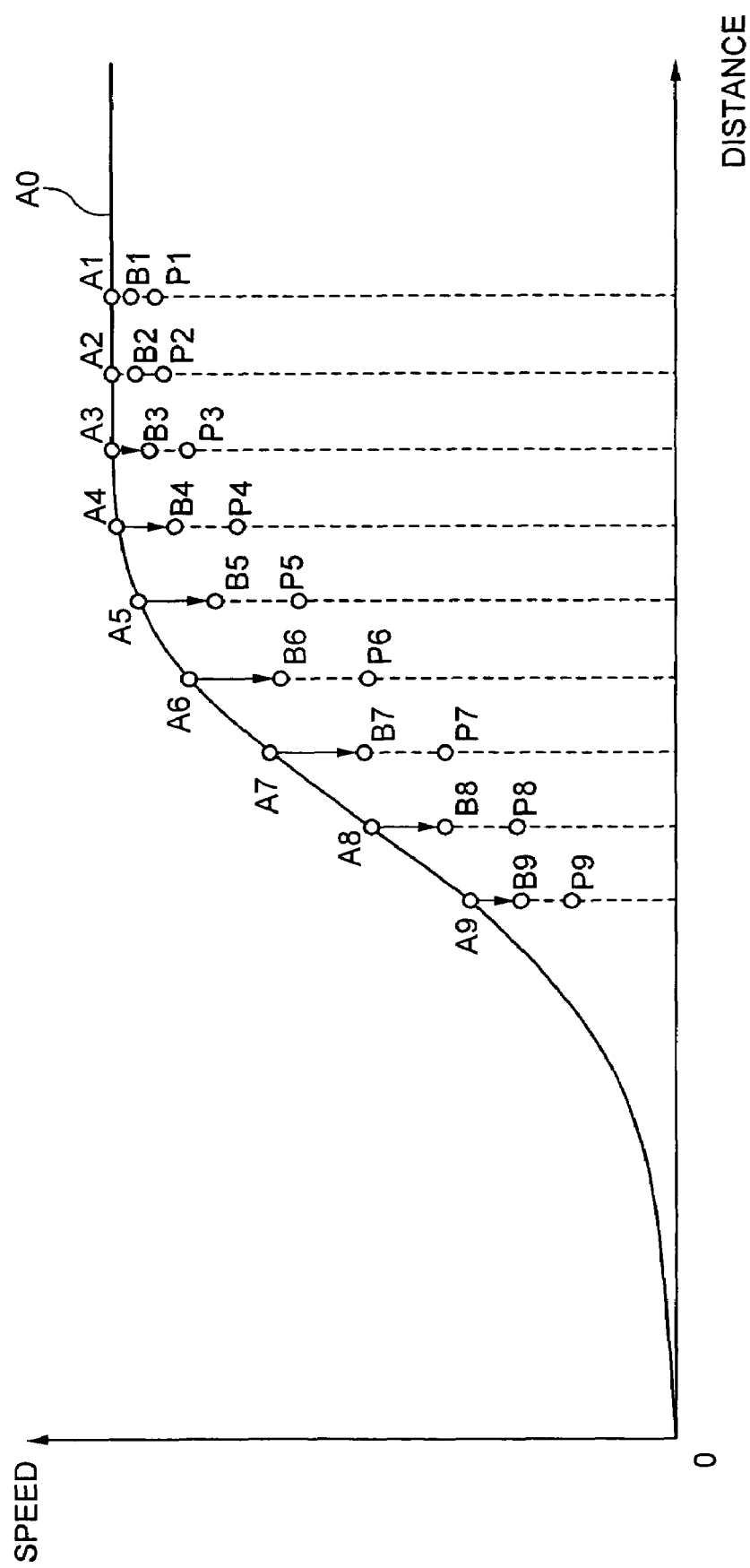
FIG. 14 is an illustration showing a state of correcting alarm speed data by an alarm speed database learning unit.

A method of correcting alarm speed data will be explained in detail by using the drawings. FIG. 14 shows examples of alarm speed data A0 at the current time selected and values A1 to A9 constituting it, travel data values P1 to P9 outputted from the object recognition unit 101 and the speed measurement unit 102, and values B1 to B9 constituting alarm speed data after correction. The alarm speed database learning unit 706 corrects the values A1 to A9 constituting the alarm speed data at the current time so as to be close to the actual travel data P1 to P9, and generates values B1 to B9 as values constituting new alarm speed data. Here, a method of determining the correction amount becomes an issue. Assuming that an alarm speed data value is w and the own vehicle speed at the corresponding point is v, the correction amount Δw is obtained from the following equation:

$$\Delta w = a(i)*(v-w)$$

Here, i indicates a counter which increments monotonically. It increments each time a new object is found, or it increments as a certain time passes. a(i) shows a learning rate, which is a positive constant. Thereby, an alarm speed data value w' after correction is expressed as follows:

$$w' = w + \Delta w = w + a(i)*(v-w)$$

For example, assuming a(i)=1, a difference between the own vehicle speed and the alarm speed data always becomes a correction amount, so the alarm speed data value w' after correction becomes the vehicle speed v observed at the current time. However, in general, the stability of the alarm speed data increases if the past traveling history is reflected, and is less affected by an adverse effect of a temporal irregularity of the driving characteristics. Therefore, a(i) may be changed as follows:

a(i)=β (where o<β<1), or
a(i)=1/i (where i=1, 2, 3, - - - ),
not setting as a(i)=1.

With such changes, the past traveling history can be reflected. Further, there is no need to keep the past travel history for a certain time period, and further it is possible to make alarm speed data close to the taste of the driver of the own vehicle although traveling history for a certain numbers cannot be obtained.

Further, processing of correcting alarm speed data by the alarm speed database learning unit 706 may be performed momentarily, or may be performed collectively after the vehicle passes a "red light" or a "stop sign" without any abnormality. According to the former correcting method, there is such a merit that travel data outputted from the object recognition unit 101 and the speed measurement unit 102 is not required to be stored continuously. On the other hand, according to the latter correction method, there is a merit that alarm speed data may be corrected only when a driver was able to recognize a "red light" or a "stop signal" properly as usual. In other words, there is a merit of not learning data different from driving characteristics that the driver likes, that is, a case where the driver overlooked a "red light" or a "stop sign" and decelerates abruptly. Further, in a case where alarm speed data is so configured that a range of distance is divided into several sections and the relationship between the distance and the speed for each section is expressed in a primary expression, values of the alarm speed data corresponding to the minimum/maximum distance of the section is corrected by the method described above, and the section may be expressed by a new primary expression.

Figure 8:
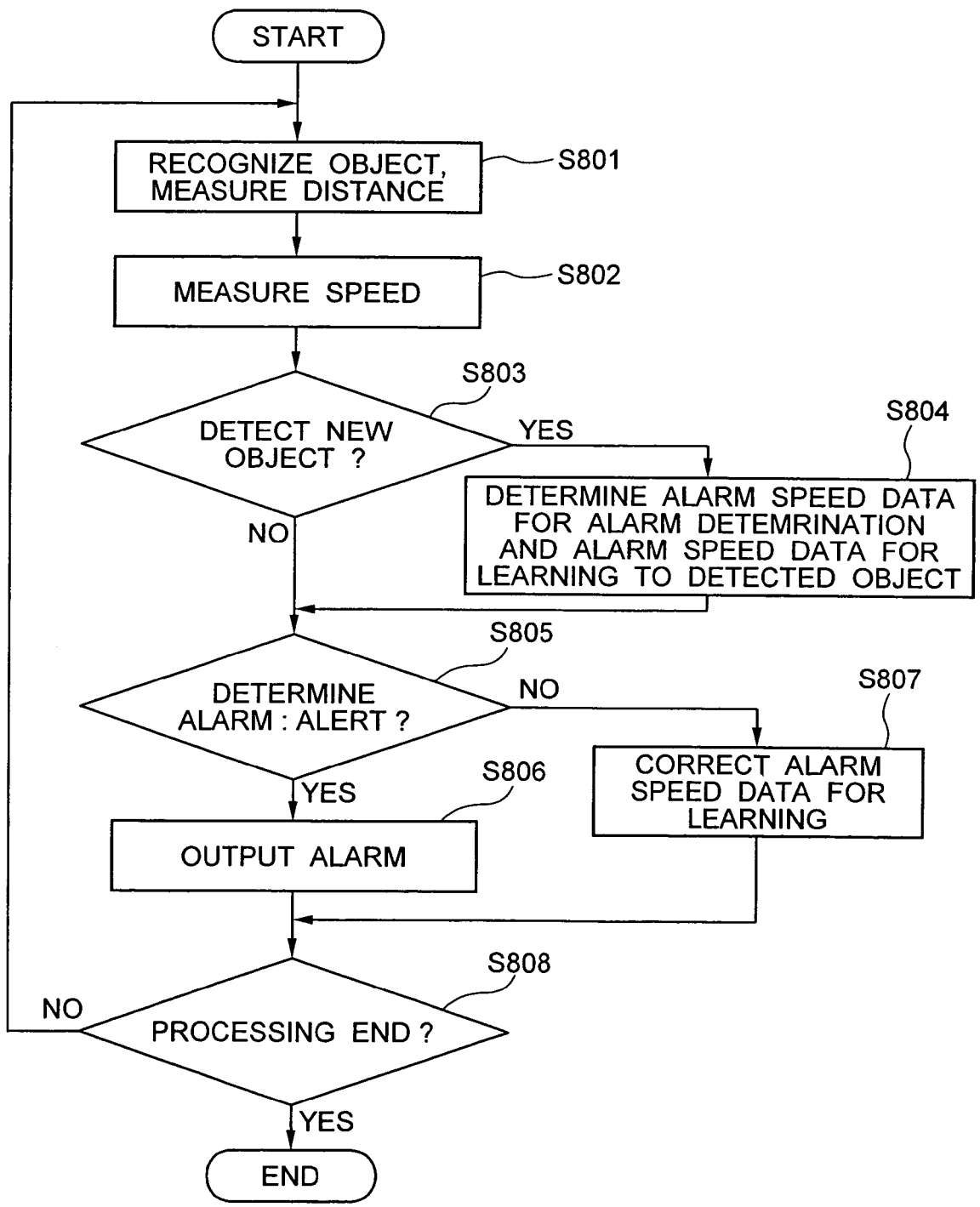
FIG. 8 is a flowchart showing an another exemplary process of the alarm processing performed by the alarm device for a vehicle.

Next, two kinds of operations in the present embodiment will be explained with reference to the drawings. FIG. 8 is a flowchart showing a case where alarm speed data is corrected momentarily.

First, a "red light", a "stop sign" and a "stop line" existing before them are detected from an on-vehicle camera image photographed in front of the own vehicle, and distances from the own vehicle to the objects are measured (step S801). Next, speed of the own vehicle is measured (step S802). Then, it is verified whether a new object has been detected in step S801 (step S803), and if a new object has been detected, alarm speed data for alarm determination used for alarm determination with respect to the object detected, and alarm speed data for learning used for learning are determined, respectively (step S804).

Next, a determination is performed to find out whether to output an alarm, from the relationship between the alarm speed data for alarm determination which has been set with respect to the object extracted in step S801 at the current time, and the distance to the object, and the current vehicle speed (step S805). If it is determined to output an alarm, an alarm is outputted with a voice or a screen display (step S806). If it is determined not to output an alarm, the alarm speed data for learning is corrected based on the current vehicle speed and the distance to the object. If there is no instruction to end processing from the driver beforehand, the processing is back to step S801 and repeats it.

With the operation described above, the alarm speed data for learning is corrected momentarily based on the current travel state, so there is a merit of not requiring to store travel data obtained momentarily.

Figure 9:
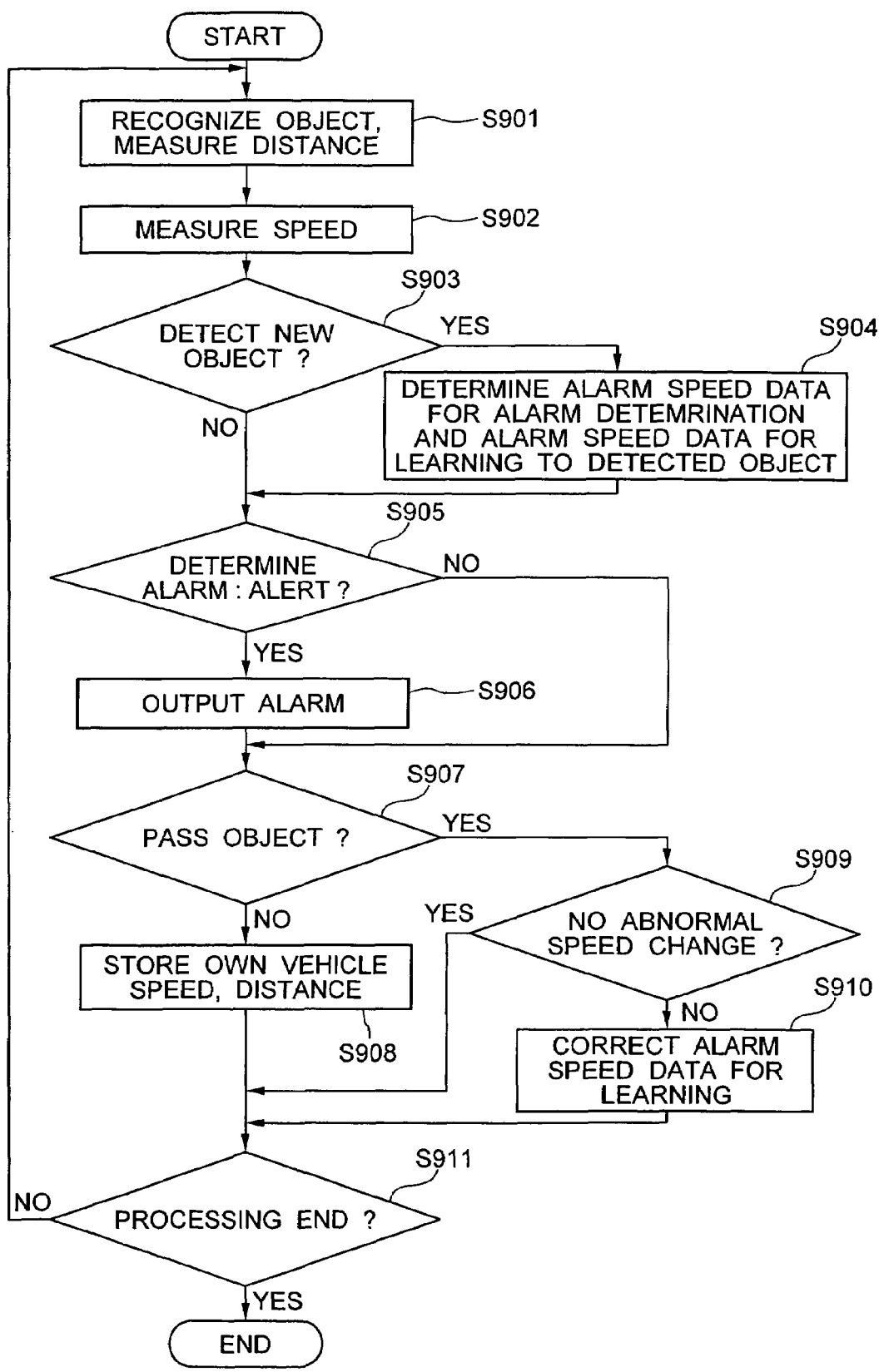
FIG. 9 is a flowchart showing an another exemplary process of the alarm processing performed by the alarm device for a vehicle.

Next, another exemplary operation will be explained with reference to FIG. 9. FIG. 9 explains an operation of correcting alarm speed data for learning collectively at a point where the vehicle passed an object, based on the travel data from a point where the vehicle detects the object to a point where the vehicle passed it. Note that the determination of passing the object may be substituted with the fact that the object is not recognized any more in the object recognition unit 101.

Steps S901 to S906 in FIG. 9 are completely the same as steps S801 to S806 in FIG. 8. In the present operation, following step S906, it is determined whether the vehicle has passed the object which had been recognized (step S907), and if the object has not been passed, the distance to the object at the current time and the own vehicle speed are stored while being correlated to the object (step S908). However, if no object is recognized currently, there is no need to store since a distance to the object is not constant. If the vehicle has passed the object, it is verified whether there is no abnormal change in the own vehicle speed during a period from extracting to passing the object (step S909), and if there is no abnormal speed change, the alarm speed data for learning is corrected collectively based on the own vehicle speed and distance value data stored (step S910). If there is an abnormal speed change in the own vehicle during a period from extracting to passing the object, the alarm speed data for learning is not corrected and travel data is discarded, and the processing proceeds to step S911. In step S911, it is checked whether to end the processing, and if it is continued, the processing is back to step S901 and repeats the steps. Here, an abnormal speed change in the own vehicle means a speed change in which deceleration was not performed at place where deceleration should be performed. According to this operation, it is possible to exclude data of the case where the driver performs driving which is different from the driving characteristics of his/her own from the learning subject.

Further, although attributes of the objects, road surface conditions and the like are not considered in determining the alarm speed data for alarm determination and alarm speed data for learning in the explanation above, alarm speed data may be prepared for each of the conditions. With such a configuration, it is possible to hold alarm speed data suitable for each condition even in a case where driving characteristics with respect to a "red light" and driving characteristics with respect to a "stop sign" are different.

Embodiment 3

Figure 12:
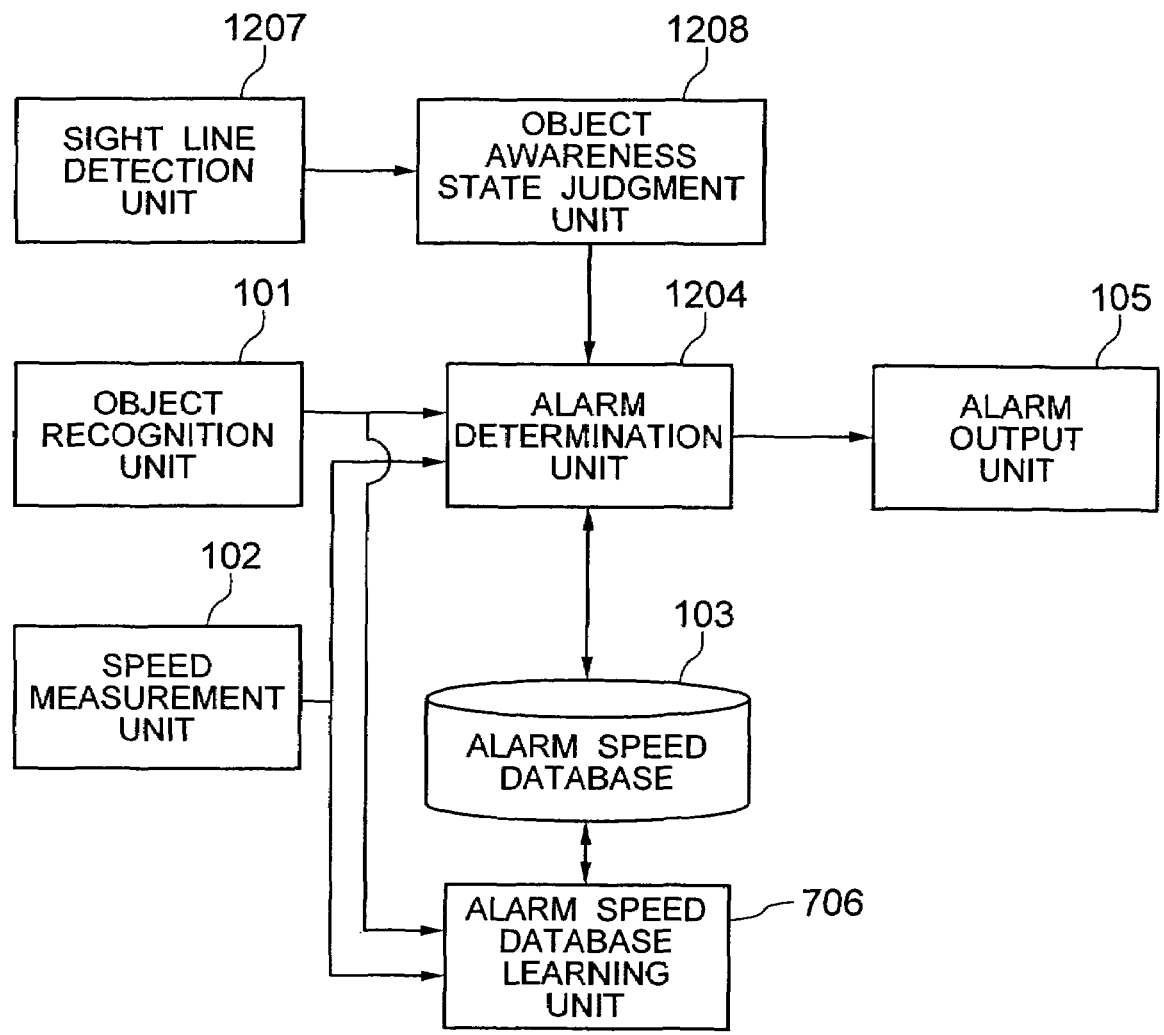
FIG. 12 is a block diagram showing an exemplary configuration of an alarm device for a vehicle according to an embodiment 3 of the present invention.

Hereinafter, an embodiment 3 of the present invention will be explained with reference to the drawings. FIG. 12 is a block diagram showing the configuration of an alarm device for a vehicle according to the present embodiment of the present invention. As shown in FIG. 12, the alarm device for a vehicle includes the object recognition unit 101, the speed measurement unit 102, the alarm speed database 103, an alarm determination unit 1204, the alarm output unit 105, the alarm speed database learning unit 706, a sight line detection unit 1207, and an object awareness state judgment unit 1208.

The functions of the object recognition unit 101 through the alarm speed database 103 and the functions of the alarm output unit 105 through the alarm speed database learning unit 706 are the same as those of the embodiment 2.

The sight line detection unit 1207 detects a sight line direction of a driver. When the object recognition unit 101 recognizes a "red light", a "stop sign" or the like, the object awareness state determination unit 1208 identifies an existing direction of the object in the actual circumstance from the position of the object in the image, and checks whether a sight line direction of the driver detected by the sight line detection unit 1207 moves toward a direction where the object exists. In a case where the sight line direction of the driver is determined to move toward a direction where the object exists even once, it is determined that the driver acknowledges the existence of the object.

The sight line detection unit 1207 and the object awareness state determination unit 1208 are realized with existing sight line direction detection devices and the like.

The alarm determination unit 1204 does not perform an alarm determination with respect to an object which is determined that the driver has already been aware of by the object awareness state determination unit 1208, and performs a determination similar to that performed by the alarm determination unit 104 shown in the embodiments 2 and 3, only to an object which is determined that the driver has not been aware of.

Thereby, it is possible to suppress generation of alarms in the case where the driver may be aware of the object even though a braking operation is somewhat delayed.

Figure 13:
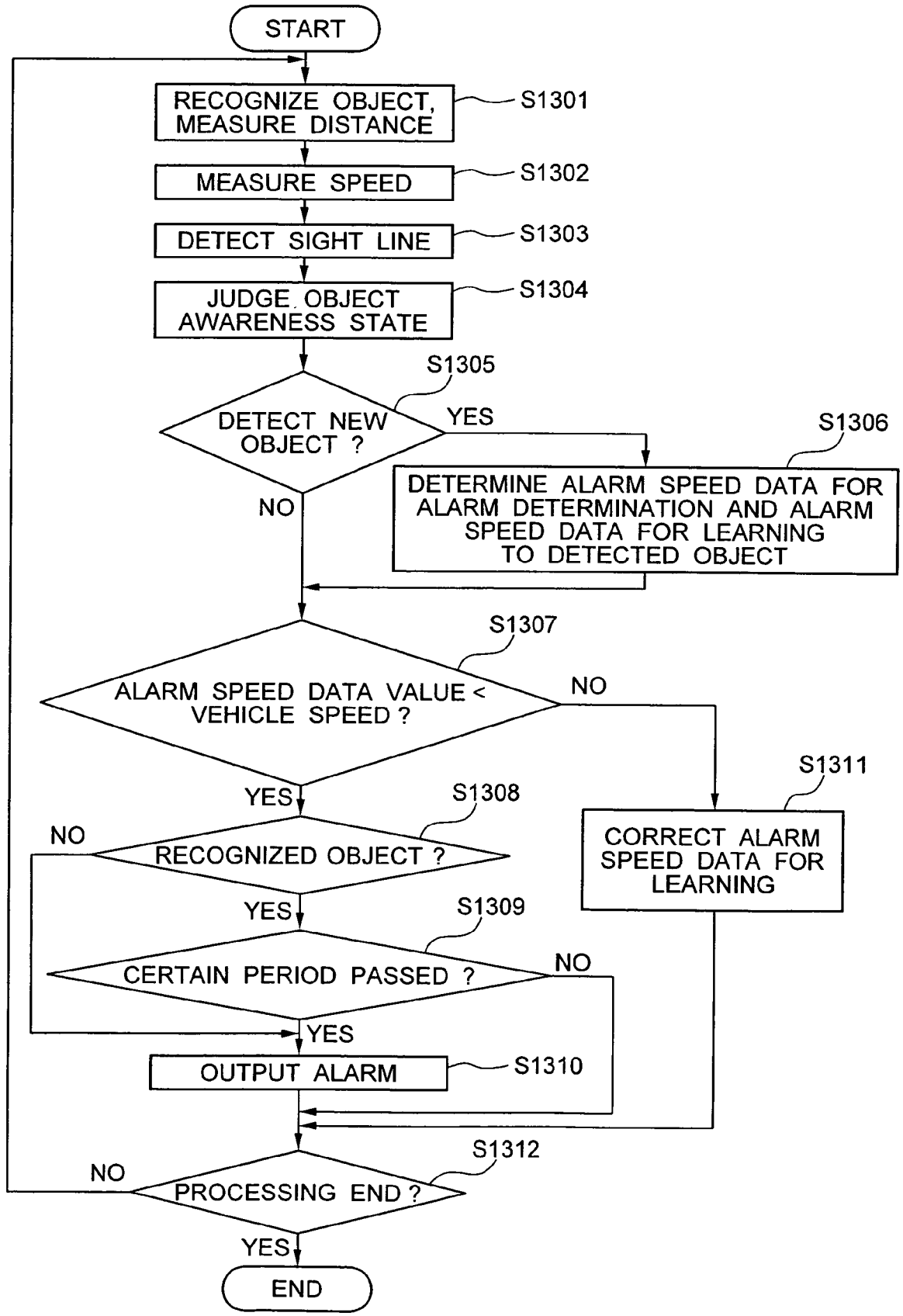
FIG. 13 is a flowchart showing another exemplary process of alarm processing performed by the alarm device for a vehicle.

Next, the operation in the present embodiment will be explained with reference to FIG. 13.

First, a "red light", a "stop sign" and a "stop line" existing before them are detected from an on-vehicle camera image photographed in front of the own vehicle, and distances from the own vehicle to the objects are measured (step S1301). Next, the speed of the own vehicle is measured (step S1302). Further, a sight line direction of the driver is detected (step 1303), and if a "red light", a "stop sign" and the like have been recognized in step S1301, it is verified whether the sight line direction detected in step S1303 moves toward the direction where they exist (step S1304), and if the sight line direction moves toward the same direction, it is determined that the driver is aware of the existence of the objects. In step S1305, it is verified whether a new object has been detected, and if a new object has been detected, alarm speed data for alarm determination used for alarm determination with respect to the object detected and alarm speed data for learning used for learning are determined respectively (step S1306), and the processing proceeds to step S1307. If a new object has not been recognized, the processing proceeds to step S1307.

In step S1307, it is verified whether the alarm speed data value exceeds the vehicle speed, from the relationship between the alarm speed data for alarm determination set, and the distance to the object, and the current vehicle speed. If the value exceeds the vehicle speed, the processing proceeds to step S1308. If it does not exceed, the alarm speed data is corrected (step S1311).

In step S1308, it is checked whether the driver is determined to be aware of the objects by the object awareness state determination unit 1208. If the driver is determined to be aware of the objects, it is checked whether a certain time period has passed from the time that the vehicle speed exceeds the alarm speed data value (step S1309), and if it exceeds, an alarm is outputted (step S1310). If a certain time period has not passed, an alarm is retained and the processing proceeds to step S1312.

If the driver is determined not to be aware of the objects in step S1308, an alarm is outputted (step S1310). If there is no instruction to end processing from the driver in step S1312, the processing is back to step S1301 again, and repeats the steps. Although, in the exemplary operation described above, it is checked whether a certain time period has passed in step S1309, determination may be performed based on a fact whether the vehicle has moved a certain distance.

According to the operation described above, if it is assumed that the driver is aware of the objects, an alarm will not be generated for a certain period even though the vehicle speed exceeds the alarm speed data value. Therefore, there is an advantage to suppress excess generation of alarms even in a case where braking is somewhat delayed than usual.

INDUSTRIAL AVAILABILITY

The present invention is applicable to all vehicles in which objects existing ahead are required to be detected so that a breaking operation is performed.

What is claimed is:

1. An alarm device for a vehicle comprising:
   an object detection unit for detecting an object existing ahead of the vehicle, and measuring a distance to the object;
   a speed measurement unit for measuring a speed of the vehicle;
   an alarm speed database for holding alarm speed data expressing a nonlinear deceleration operation, substantially matching the individual driving characteristics of the driver, with respect to the distance from the vehicle to the object, and the speed of the vehicle;
   an alarm determination unit for obtaining a speed corresponding to a distance to the object at a current time by referring to the alarm speed data and setting it as an alarm speed value at the current time, and if the speed of the vehicle at the current time exceeds the alarm speed value, determining a state as abnormal; and
   alarm output unit for outputting an alarm when the alarm determination unit determines the state as abnormal.

2. The alarm device for the vehicle, as claimed in claim 1, further comprising an alarm speed database learning unit for correcting a value of the alarm speed data.

3. The alarm device for the vehicle, as claimed in claim 2, wherein the alarm speed database learning unit corrects the value of alarm speed data to better match the distance to the object detected and the speed of the vehicle.

4. The alarm device for the vehicle, as claimed in claim 1, wherein the alarm speed database includes plural pieces of alarm speed data, and the alarm determination unit determines alarm speed data used for an alarm determination based on the speed of the vehicle at a point where the distance from the object and the speed of the vehicle satisfy a predetermined condition for a first time.

5. The alarm device for the vehicle, as claimed in claim 4, wherein an alarm speed database learning unit determines an alarm speed data to be corrected based on the speed of the vehicle at the point where the distance from the object and speed of the vehicle satisfy a predetermined condition for the first time.

6. The alarm device for the vehicle, as claimed in claim 5, wherein the object detection unit recognizes a type of the object.

7. The alarm device for the vehicle, as claimed in claim 6, wherein the alarm speed database learning unit and the alarm determination unit determine alarm speed data to be used, based on the speed of the vehicle at the point where the distance from the object and the speed of the vehicle satisfy a predetermined condition for the first time and on an attribute of the object.

8. The alarm device for the vehicle, as claimed in claim 7, further comprising a road condition recognition unit for recognizing a road condition where the vehicle travels, and the alarm speed database learning unit and the alarm determination unit determine alarm speed data to be used while considering the road condition.

9. The alarm device for the vehicle, as claimed in claim 1, further comprising:
   a sight line detection unit for detecting a sight line direction of the driver of the vehicle; and
   an object awareness state judgment unit for determining whether the driver is aware of the existence of the object from information of a direction of the object and a sight line direction, wherein
   even in a case where the speed of the vehicle exceeds the alarm speed value, the alarm determination unit delays a judgment of abnormality for a predetermined period when the object awareness state judgment unit determines that the driver is aware of the object.

10. An alarming method for a vehicle comprising the steps of:
    detecting an object existing ahead of the vehicle, and measuring a distance to the object;
    measuring a speed of the vehicle; and
    setting a speed corresponding to the distance to the object as an alarm speed value at a current time by referring to an alarm speed database including alarm speed data expressing a nonlinear deceleration operation, substantially matching the individual driving characteristics of the driver, with respect to a distance to the object and the speed of the vehicle, and if the speed of the vehicle at the current time exceeds the alarm speed value, determining a state as abnormal; and
    outputting an alarm when the state is abnormal.

11. The alarming method for the vehicle, as claimed in claim 10, wherein a value of the alarm speed data is corrected to better match the distance to the object and the speed of the vehicle.

12. The alarming method for the vehicle, as claimed in claim 10, wherein the alarm speed data used for an alarm determination is determined among plural pieces of alarm speed data included in the alarm speed database, based on the speed of the vehicle at a point where the distance to the object and the speed of the vehicle satisfy a predetermined condition for the first time.

13. The alarming method for the vehicle, as claimed in claim 12, wherein an alarm speed data to be corrected is determined based on the speed of the vehicle at a point where the distance to the object and the speed of the vehicle satisfy a predetermined condition for the first time.

14. The alarming method for the vehicle, as claimed in claim 13, wherein a type of the object ahead of the vehicle is recognized.

15. The alarming method for the vehicle, as claimed in claim 14, wherein an alarm speed data to be used is determined based on the speed of the vehicle at a point where the distance to the object and the speed of the vehicle satisfy a predetermined condition for the first time and on an attribute of the object.

16. The alarming method for the vehicle, as claimed in claim 15, wherein a road condition where the vehicle travels is recognized, and alarm speed data to be used is determined by referring to the road condition.

17. The alarming method for the vehicle, as claimed in claim 10, further comprising the steps of:
    detecting a sight line direction of the driver of the vehicle;
    determining whether the driver is aware of the object based on a direction of the object and the sight line direction detected; and
    delaying a judgment of abnormality for a predetermined period when the driver is aware of the object even though the speed of the vehicle exceeds the alarm speed value.

18. An alarm generation program for a vehicle for prompting a computer to perform:

a function of an object detection unit for detecting an object existing ahead of the vehicle and measuring a distance to the object;

a function of a speed measurement unit for measuring a speed of the vehicle;

a function of an alarm determination unit for extracting a speed corresponding to the distance to the object and setting it as an alarm speed value at a current time by referring to an alarm speed database including alarm speed data expressing a nonlinear deceleration operation, substantially matching the individual driving characteristics of the driver, with respect to a distance to the object and the speed of the vehicle, and when the speed of the vehicle at the current time exceeds the alarm speed value determining a state as abnormal; and a function of an alarm output unit for outputting an alarm when the alarm determination unit determines the state as abnormal.

19. The alarm generation program for the vehicle, as claimed in claim 18, for prompting an alarm speed database learning unit to execute a function of correcting a value of the alarm speed data to better match the distance to the object and the speed of the vehicle.

20. The alarm generation program for the vehicle, as claimed in claim 18, for prompting the alarm determination unit to execute a function of determining alarm speed data used for an alarm determination among plural pieces of alarm speed data included in the alarm speed database, based on the speed of the vehicle at a point where the distance to the object and the speed of the vehicle satisfy a predetermined condition for the first time.

21. The alarm generation program for the vehicle, as claimed in claim 20, for prompting an alarm speed database learning unit to execute a function of determining an alarm speed data to be corrected, based on the speed of the vehicle at a point where the distance to the object and the speed of the vehicle satisfy a predetermined condition for the first time.

22. The alarm generation program for the vehicle, as claimed in claim 21, for prompting the object detection unit to recognize a type of the object.

23. The alarm generation program for the vehicle, as claimed in claim 22, for prompting the alarm speed database learning unit and the alarm determination unit to execute a function of determining alarm speed data to be used, based on the speed of the vehicle at a point where the distance to the object and the speed of the vehicle satisfy a predetermined condition for the first time and on an attribute of the object.

24. The alarm generation program for the vehicle, as claimed in claim 23, for prompting a road condition recognition unit to execute a function of recognizing a road condition where the vehicle travels; and prompting the alarm speed database learning unit and the alarm determination unit to execute a function of determining alarm speed data to be used by referring to the road condition.

25. The alarm generation program for the vehicle, as claimed in claim 18, for prompting a sight line detection unit to execute a function of detecting a sight line direction of the driver of the vehicle, prompting an object awareness state judgment unit to execute a function of determining whether the driver is aware of an existence of the object from information of a direction of the object and the sight line direction, and even though the speed of the vehicle exceeds the alarm speed value, prompting the alarm determination unit to execute a function of delaying a judgment of abnormality for a predetermined period when the object awareness state judgment unit determines that the driver is aware of the object.

* * * * *